United States Patent
Donaldson et al.

(10) Patent No.: US 9,020,318 B2
(45) Date of Patent: Apr. 28, 2015

(54) OPTICAL CONNECTOR ORGANIZER

(75) Inventors: Christopher Donaldson, Greenville, SC (US); Eddie Kimbrell, Dacula, GA (US); Ted Lichoulas, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 13/377,349

(22) PCT Filed: Mar. 25, 2011

(86) PCT No.: PCT/US2011/029960
§ 371 (c)(1),
(2), (4) Date: Dec. 9, 2011

(87) PCT Pub. No.: WO2011/123354
PCT Pub. Date: Oct. 6, 2011

(65) Prior Publication Data
US 2012/0099826 A1   Apr. 26, 2012

Related U.S. Application Data

(60) Provisional application No. 61/318,528, filed on Mar. 29, 2010.

(51) Int. Cl.
*G02B 6/00* (2006.01)
*G02B 6/36* (2006.01)
*G02B 6/38* (2006.01)
*G02B 6/44* (2006.01)

(52) U.S. Cl.
CPC ............ *G02B 6/3897* (2013.01); *G02B 6/3849* (2013.01); *G02B 6/4463* (2013.01)

(58) Field of Classification Search
CPC .. G02B 6/4452; G02B 6/4455; G02B 6/4454; G02B 6/3897
USPC ..................................... 385/53, 134, 135, 136
See application file for complete search history.

(56) References Cited

U.S. PATENT DOCUMENTS

| | | |
|---|---|---|
| 1,434,350 A | 10/1922 | Collins |
| 5,097,529 A | 3/1992 | Cobb et al. |
| 5,367,598 A | 11/1994 | Devenish, III et al. |
| 5,544,387 A | 8/1996 | Yamamoto et al. |
| 2003/0209903 A1 | 11/2003 | Morris |
| 2004/0001686 A1* | 1/2004 | Smith et al. ................... 385/135 |

(Continued)

OTHER PUBLICATIONS

International Search Report, PCT/US2011/029960, May 27, 2011.

(Continued)

*Primary Examiner* — Kaveh Kianni
*Assistant Examiner* — Hung Lam
(74) *Attorney, Agent, or Firm* — Sughrue Mion, PLLC

(57) ABSTRACT

A conductor packaging assembly for packaging a plurality of conductors is provided. The assembly includes a housing and a plurality of connectors organized in the housing. The housing includes a first half and a second half hingedly attached with each other at one ends thereof and configured to removably attach with each other at their other ends to allow an open and closed position of the housing. Further, an inner strip is attached to the first half and/or the second half, a connector organizer is removably attached to the inner strip, and the connector organizer includes a plurality of connector mounting portions for removably attaching the plurality of connectors to the plurality of connector mounting portions.

11 Claims, 7 Drawing Sheets

(56) References Cited

U.S. PATENT DOCUMENTS

| | | |
|---|---|---|
| 2009/0008280 A1 | 1/2009 | Nilferli et al. |
| 2009/0185782 A1 | 7/2009 | Parikh et al. |
| 2009/0285534 A1 | 11/2009 | Ishikawa |
| 2009/0310927 A1* | 12/2009 | Riggsby et al. ............... 385/135 |
| 2010/0086275 A1* | 4/2010 | Krampotich et al. ......... 385/135 |
| 2012/0002934 A1* | 1/2012 | Kimbrell et al. .............. 385/135 |

OTHER PUBLICATIONS

Teltek Splicing, Catalog [online] Teltek, Retrieve from the Internet: <URL:http://web.archive.org/*/http://www.telteksales.com/Splicing%20Section.pdf>, Nov. 10, 2006, p. 43.

* cited by examiner

OPTICAL CONNECTOR ORGANIZER

CROSS-REFERENCE TO RELATED APPLICATION

This application claims priority from U.S. Provisional Application No. 61/318,528 filed on Mar. 29, 2010, the disclosure of which is incorporated herein by reference in its entirety. The present application is related to International Application No. PCT/US2010/022037 filed on Jan. 26, 2010 based on U.S. application Ser. No. 61/147,265, and to International Application No. PCT/US2010/042735 filed on Jul. 21, 2010 based on U.S. application Ser. No. 61/227,223, the contents of all of which are incorporated by reference in their entirety.

BACKGROUND

1. Field of the Invention

The present invention relates to an apparatus for packaging and organizing conductors, such as optical fibers, that have connectors at one of their ends. More specifically, the present invention relates to an apparatus for organizing the connectors.

2. Related Art

High Fiber Count (HFC) fiber optic cable assemblies (fiber optic cable trunks with 12 or more fibers which are broken out into individual connectors on one or both ends) are used to build fiber optic backbones. The break-out end(s) of these HFC fiber optic cables consist of numerous individual fibers terminated with fiber optic connectors (such as SC, LC, FC, and ST connectors) which are bulky and difficult to package efficiently and compactly.

Conventional practice has been to install a flexible tube over the bundled connectors that is secured to the cable. This is done to prevent damage during shipping and handling. This packaging is typically sealed in the factory. This methodology makes it difficult to route the cable in ducts, wireways, and in panels due to its size. Further, the high fiber count packaging needs to be opened to perform a continuity check on the cable before the HFC fiber optic cable is installed. As a result, installers often will remove this packaging before attempting to install the HFC cable risking damage to the product. Once the inspection has been performed, this packaging methodology makes it difficult to reseal the packaging.

In addition, after the cable assembly is packaged, the conventional technology does not allow the manufacturing facility to verify that the fiber is not kinked or otherwise damaged. Also, conventional technology does not organize the connectors in a concise small package, but is instead large and bulky in size and shape. As mentioned above, the conventional packaging with the corrugated tube is sometimes too large to pull through cable ductwork, raceways, or conduits in the field. In addition, conventional technology is also not modular in design, and thus cannot be easily grouped and ungrouped with other such packages of fiber bundles causing additional bulkiness in transport. Further, the conventional technology is expensive.

Two related international applications (International Application No. PCT/US2010/022037 and International Application No. PCT/US2010/042735) by the current Applicant (AFL Telecommunications LLC) have tried to address some of the above issues. They provide a simplified method of packaging fiber bundles that is more time and cost efficient than the conventional methods and which provides adequate protection of the fibers.

These two applications provide a modular housing for packaging the fiber bundles. In the '037 application, the fiber optic connectors are held in the packaging case (housing) in a pocket and retained with a snap-in C-clip. FIG. 1 of the '037 application describes the housing and FIG. 2 of the '037 application describes one half of the housing. FIG. 2 of the '037 application illustrates six connecting portions on the first half that extend in a longitudinal direction along which the fibers extend and the connectors are retained in these connecting portions. The snap-in C-clip retains the connectors in the connecting portions.

The '735 application also provides a modular, re-sealable fiber optic high fiber count packaging in which the fiber optic connectors are held to the packaging case using an interior snap feature.

There is a need for better organizing and securing the fiber optic connectors in the packaging apparatuses/housings described in the '037 and '735 applications.

SUMMARY

According to an exemplary embodiment, a conductor packaging assembly for packaging a plurality of conductors is provided. The assembly includes a housing and a plurality of connectors organized in the housing. The housing includes a first half and a second half hingedly attached with each other at one ends thereof and configured to removably attach with each other at their other ends to allow an open and closed position of the housing. Further, an inner strip is attached to the first half and/or the second half, a connector organizer is removably attached to the inner strip, and the connector organizer includes a plurality of connector mounting portions for removably attaching the plurality of connectors to the plurality of connector mounting portions.

Exemplarily, the inner strip and the connector organizer attach with each other in a hook-n-loop arrangement.

Exemplarily, the first half and the second half each have a substantial U-shape in cross section and form a hollow cylindrical shape when attached to one another.

Exemplarily, a pull tab is integrally formed with the connector organizer to allow the connector organize to be detached from the inner strip.

Exemplarily, the inner strip is a Velcro strip. Further, the connector organizer may have a Velcro strip on one side thereof which attaches with the inner strip.

BRIEF DESCRIPTION OF THE FIGURES

The following is a brief description of the Figures, in which like elements are referred to with like reference numerals.

DETAILED DESCRIPTION OF THE EXEMPLARY EMBODIMENTS

Figure 1A:
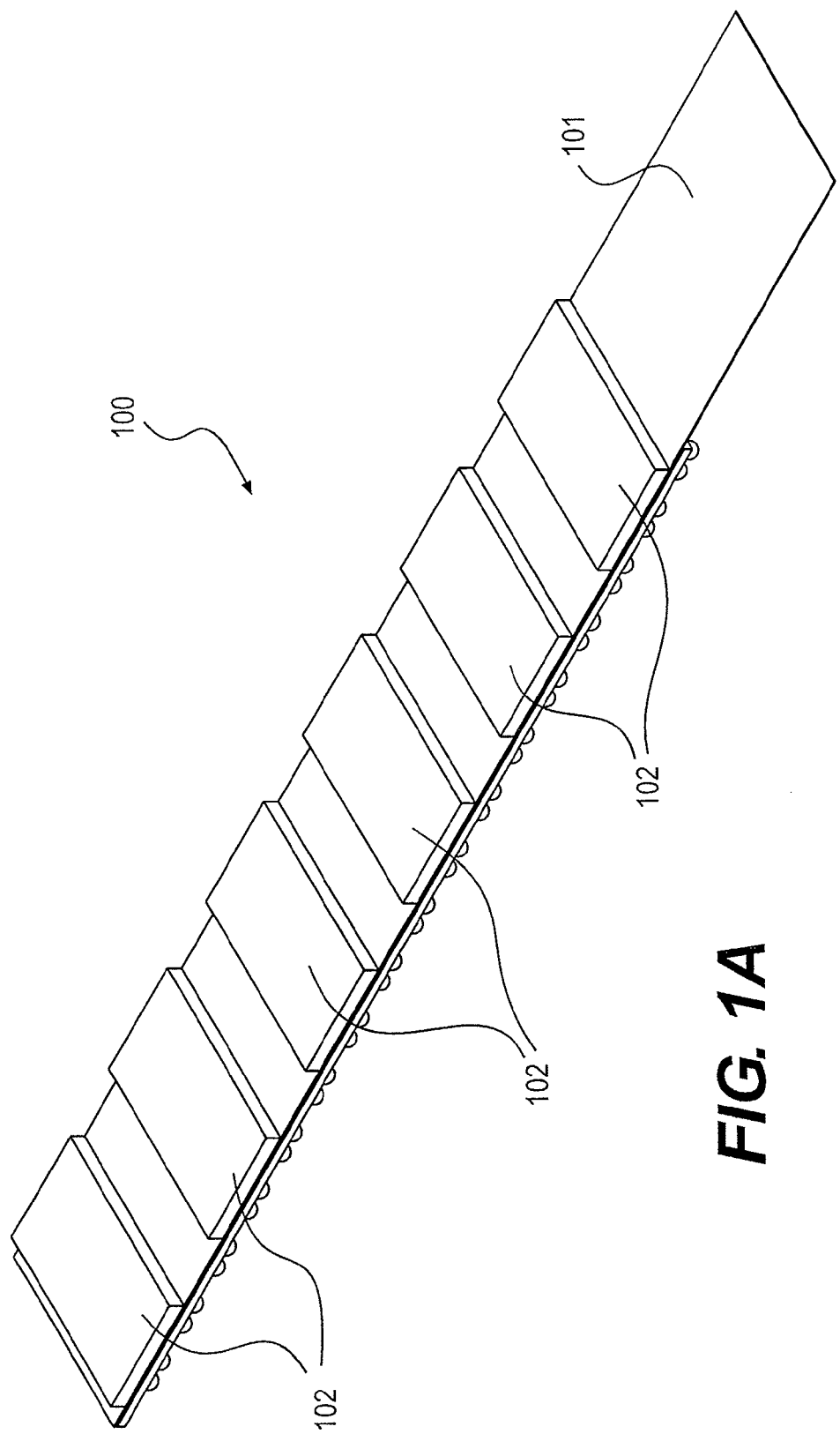
FIG. 1A illustrates a top surface of an exemplary connector organizer.

Exemplary embodiments of the present disclosure will now be described more fully with reference to the accompanying drawings in which same drawing reference numerals refer to the same elements. Also, well-known functions or constructions are not described in detail since they would obscure the invention with unnecessary detail.

FIG. 1A illustrates an exemplary embodiment of a connector organizer 100. FIG. 1A shows the top surface of the connector organizer 100. The top surface includes a pull tab 101 and connector mounting portions 102. Exemplarily, six connector mounting portions 102 are shown in FIG. 1A. It will be understood that the number six has been selected for purposes of illustration only.

The connector mounting portion 102 may be provided with double-sided adhesive tape that holds the connector in position until the installer wants to remove them. It will be understood that the double-sided adhesive tape is one of several techniques for mounting the connector the connector mounting portion 102.

Figure 1B:
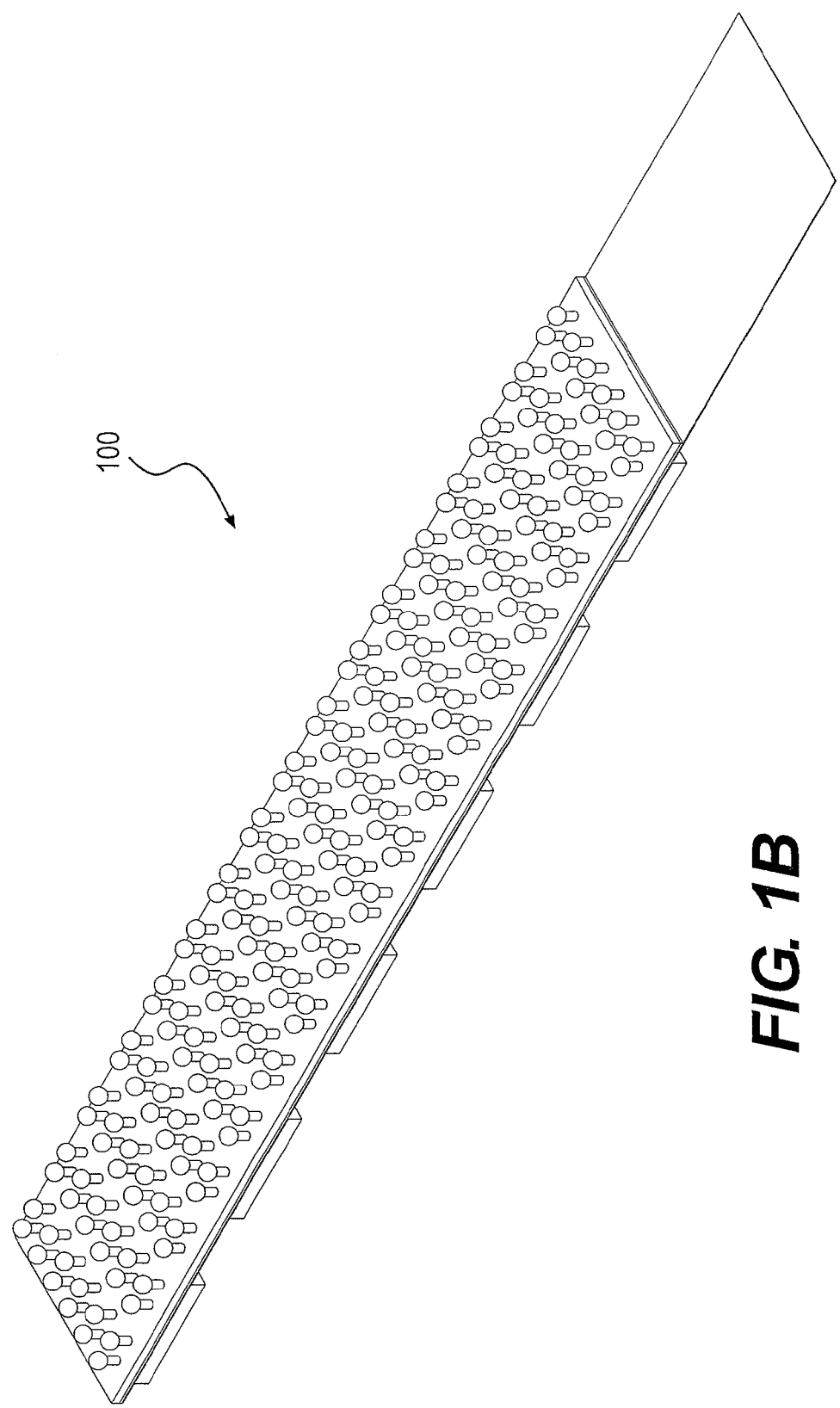
FIG. 1B describes the bottom surface of the exemplary connector organizer.

FIG. 1B describes the bottom surface of the connector organizer 100. The bottom surface of the connector organizer 100 is a bonding strip for use in a dual-lock arrangement or hook-and-loop arrangement. Exemplarily, the bonding strip may be a Velcro strip.

Figure 2:
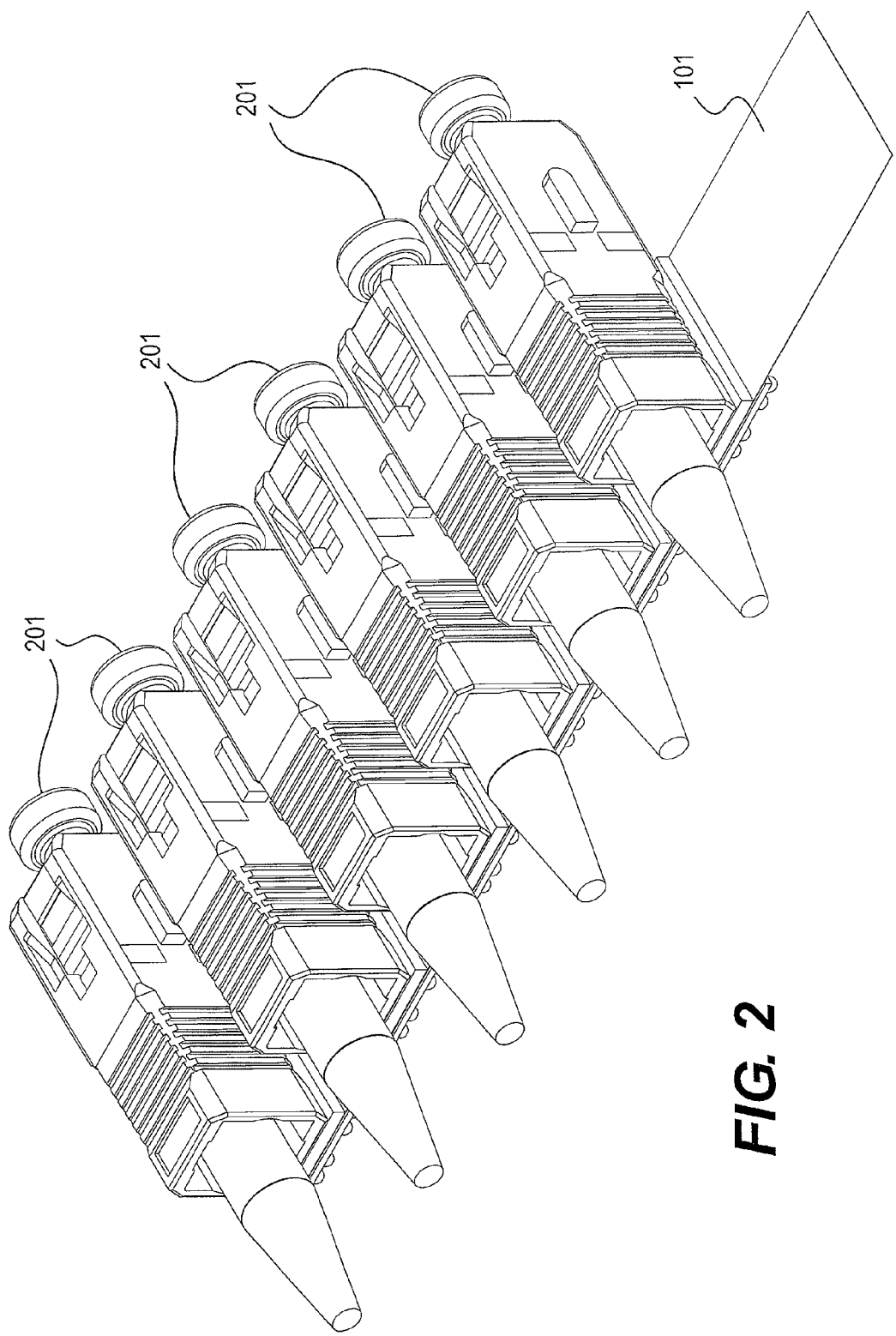
FIG. 2 illustrates an exemplary assembly in which six fiber optic connectors are attached to the respective connector mounting portions on the exemplary connector organizer.

FIG. 2 illustrates an exemplary assembly in which six fiber optic connectors 201 are attached to the respective connector mounting portions 102 on the connector organizer 100. In the example described in FIG. 2, the connectors are SC connectors. However, various types of connectors may be attached to the connector mounting portions 102. It will be observed that by providing the above arrangement, the connectors can be prevented from tangling with each other and the order of the connectors can be maintained.

Figure 3:
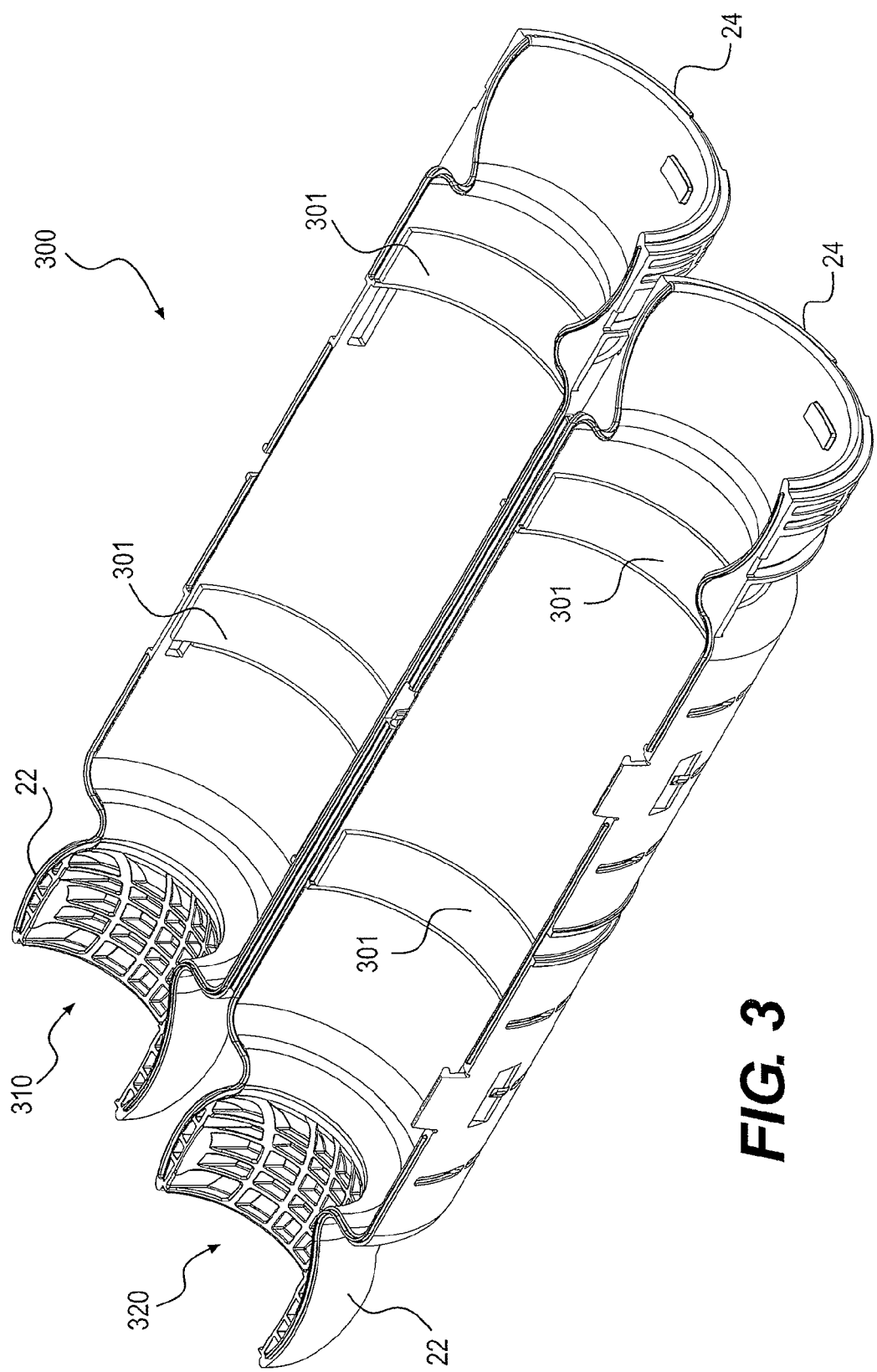
FIG. 3 illustrates a housing in which the exemplary connector organizer is installed.

FIG. 3 illustrates a housing 300 similar to that described in International Application No. PCT/US2010/042735. The housing 300 may be made of plastic or similar material. The housing 300 includes two halves 310 and 320 that are connected to one another by a hinge. Alternatively, these halves could be removably attached with each other. FIG. 3 illustrates an open position of the housing 300. The two halves 310 and 320 each have a substantial U-shape in cross section and form a hollow cylindrical shape when attached to one another, i.e., in a closed position. The two halves 310 and 320 are configured to removably attach with each other via a snap feature.

Figure 4:
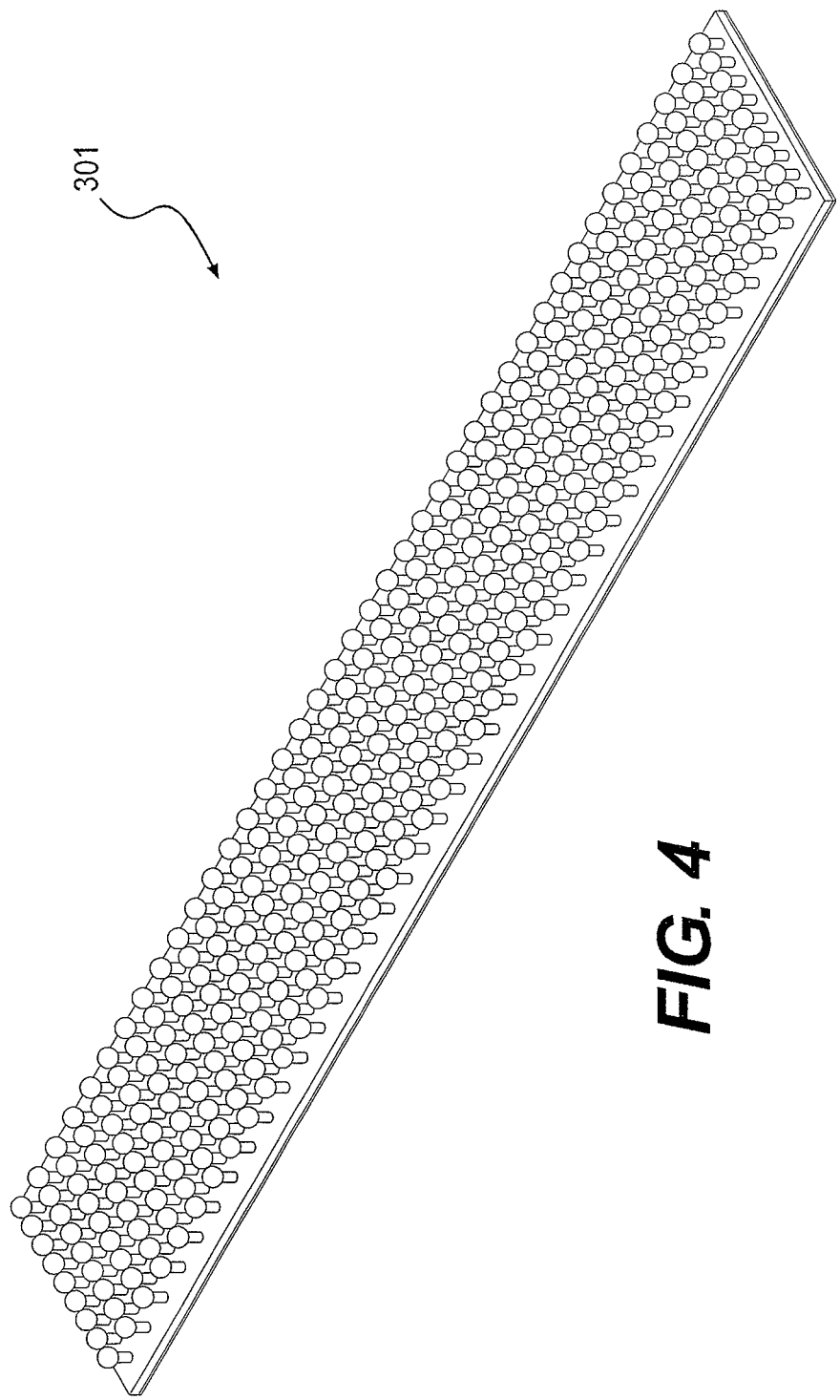
FIG. 4 illustrates a Velcro strip which is exemplarily used on the bottom surface of the connector organizer and is further attached to the housing.

Furthermore, two inner strips 301 are attached to the each of two halves 310 and 320. The inner strips 301 are also Velcro strips and are illustrated in FIG. 4. The inner strips are for attaching the connector organizer 100 to the housing. The inner strips 301 may be placed at multiple locations in the housing depending on the connector and cable types. Furthermore, more than or less than two inner strips 301 may be provided on each half. Exemplarily, the inner strips 301 may be provided on only one of the two halves 310 and 320. In the current exemplary embodiment, the inner strip 301 is glued to the halves 310 and 320.

By providing the above arrangement as shown in FIG. 3, the assembly of FIG. 2 may be attached to the inner strips in a hook-n-loop arrangement because the bottom portion of the connector organizer is also a Velcro and will couple with the inner strip. Therefore, the connector organizer may be removably attached to the housing 300 and may be removed for servicing purposes as and when needed while maintaining the connector organization.

Furthermore, it may be possible to use a snap-in connector organizer that can be directly mounted to the housing without coupling with another strip. Exemplarily, the snap-in connector organizer may take the shape of the housing.

Figure 5:
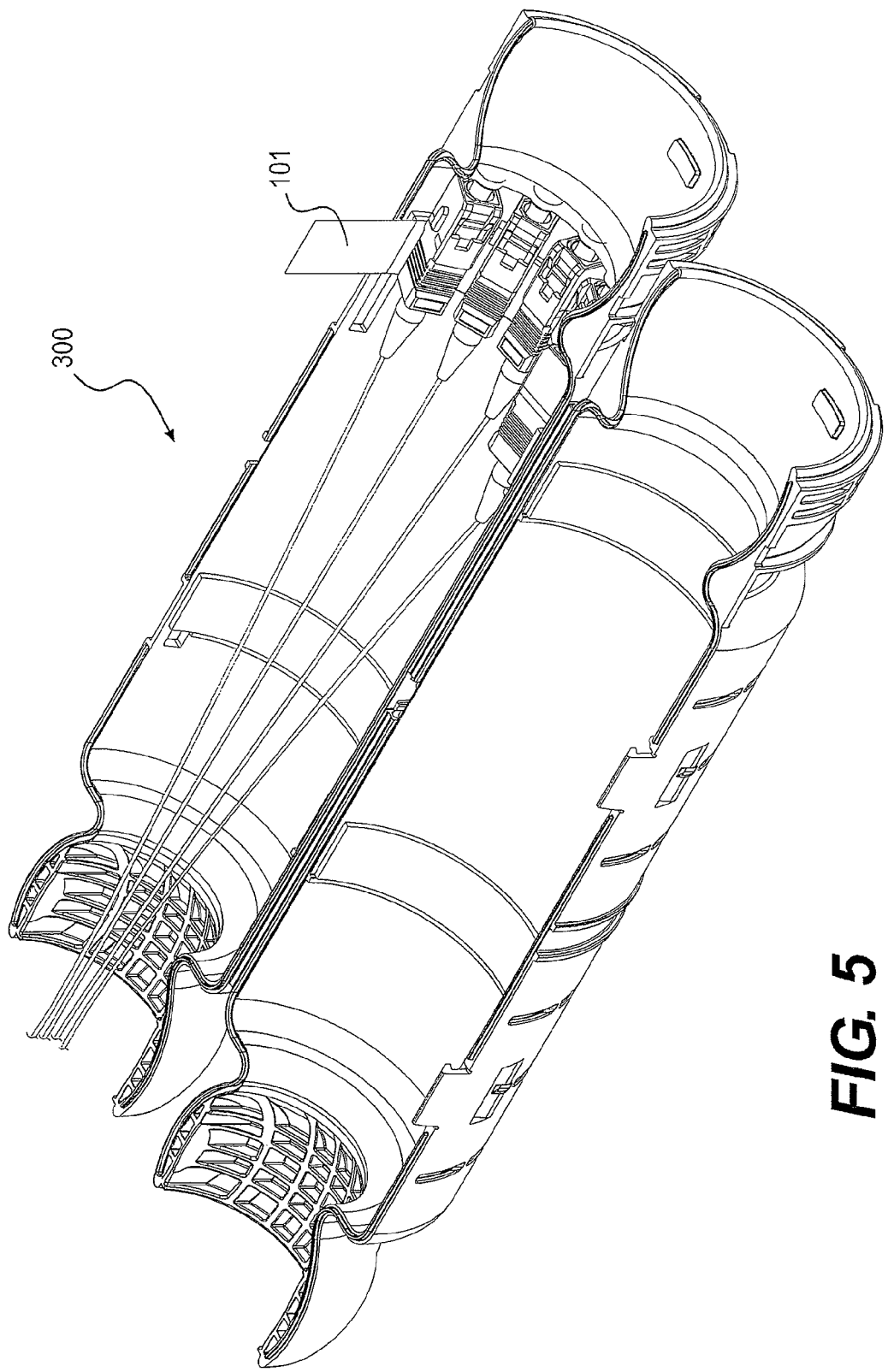
FIG. 5 illustrates an exemplary assembly in which the assembly of FIG. 2 is attached to one of the inner strips.

FIG. 5 illustrates an exemplary assembly in which the assembly of FIG. 2 is attached to one of the inner strips 301. The assembly can be easily removed by pulling the pull tab 101.

Figure 6:
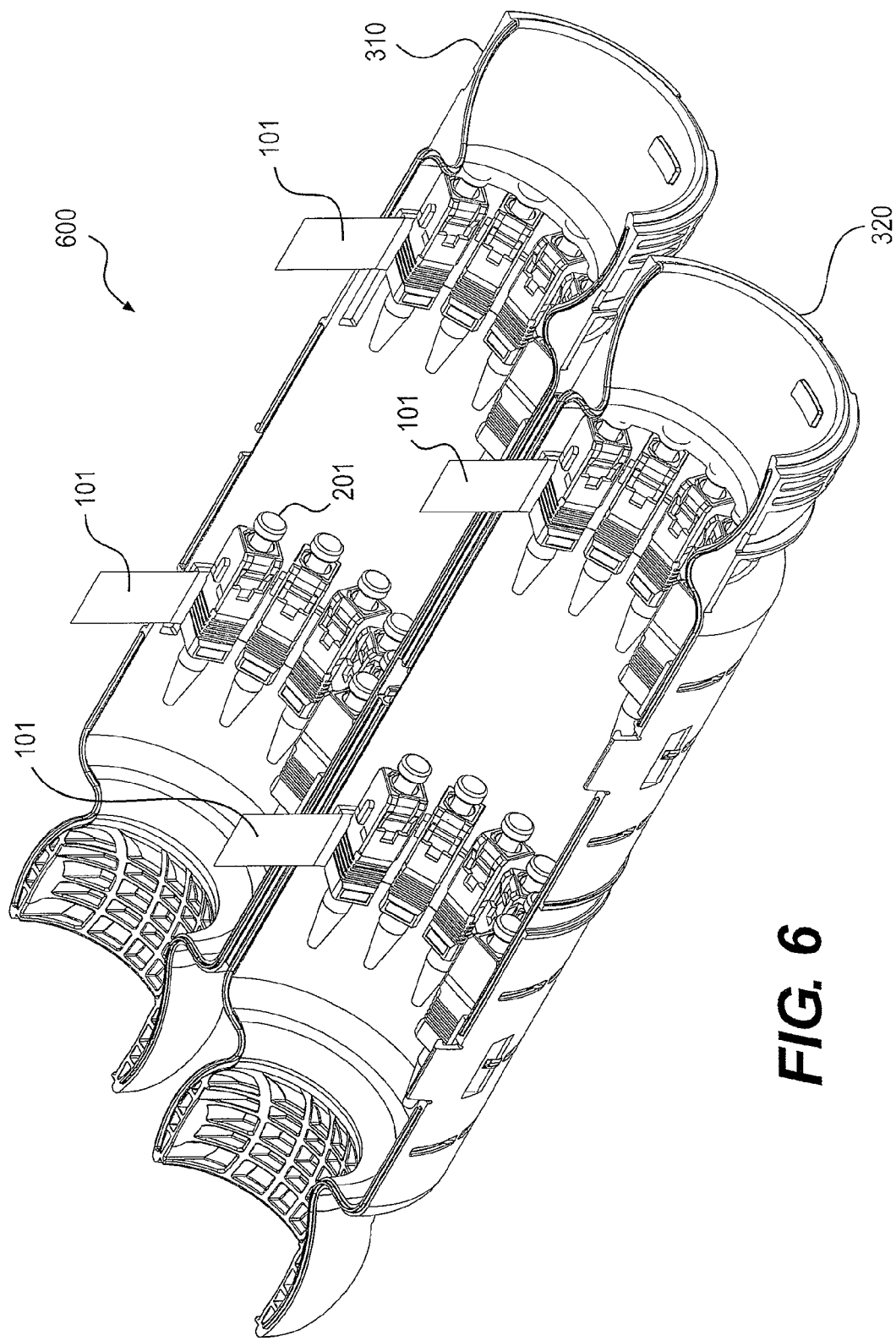
FIG. 6 illustrates an exemplary conductor packaging assembly.

FIG. 6 illustrates a conductor packaging assembly 600 in which twenty four connectors are exemplarily organized using inner strips 301 on both the halves 310 and 320.

The exemplary embodiments described above provide an improved method for securing the fiber optic connectors in the housings described in the two cited patent applications. Removable organizing strips are installed into the housings. Individual connectors are placed on the connector organizer. The connector organizer may then be removed and reinserted easily to facilitate inspection and test.

An advantage of the above exemplary embodiments is that the connector organizer can accommodate various connector types, i.e., once the connector organizer is manufactured, it is not limited to the shape of a particular connector type. The connector organizer is inexpensive to manufacture and it is reusable. The connector organizer can be installed in optimal positions (depending on connector and/or cable types) within the re-sealable module (re-sealable housing). The connector organizer secures the fiber optic connectors from mechanical shock applied to the packaging. The new design is intuitive for manufacturers to package the connectors and for installers un-packaging the connectors. The connectors are positioned on the connector organizer to allow inspection and test without removing the connectors in both the factory and/or field. Exemplary embodiments allow for convenient marking and identifying of the individual connector positions and subunits, thereby providing easier and more efficient fiber connector identification when the connectors are unpacked and placed into service by the installer.

Further, the exemplary embodiment (such as the one described in FIG. 6) provides protection to the connectors 201 and respective fibers by encapsulating the connectors 201 inside the housing 300, thereby protecting these components from mechanical damage and environmental contamination during installation.

Further description about the housing 300 will now be provided. A U-shaped slot is formed at each end of the two halves 310 and 320 to define a conductor insertion hole at each end thereof. Each of the halves 310 and 320 may include a semicircular male portion 22, i.e., a socket portion, at one end, and a semicircular female portion 24, i.e., a ball portion, at the other end. The male portion 22 and the female portion 24 are formed integrally with the two halves 310 and 320 wherein the male portion 22 includes two halves and the female portion includes two halves.

The male portion 22 of one housing 300 may be placed between and fits within two halves of a female portion 24 of another housing 300, whereby two housings may be connected to one another through a ball and socket arrangement. By providing the ball and socket arrangement, the two connected housings may rotate and bend relative to one another and thereby the connected housings can easily wrap around, an arc of a cable reel or follow a bend of a conduit or cable tray.

Although the above exemplary embodiments have been described, they are not limiting, and it will be understood by those skilled in the art that the present invention should not be limited to the described exemplary aspects and embodiments, but that various changes and modifications can be made within the spirit and scope of the present invention.

What is claimed is:

1. A conductor packaging assembly for packaging a plurality of conductors, the assembly comprising:
    a housing; and
    a plurality of connectors organized in the housing,
    wherein:
        the housing includes a first half and a second half hingedly attached with each other at one ends thereof and configured to removably attach with each other at their other ends to allow an open and closed position of the housing,
        an inner strip is directly attached to an inner surface of at least one of said first half and second half,
        a connector organizer is removably attached to the inner strip, and
        the connector organizer includes a plurality of connector mounting portions for removably attaching the plurality of connectors to the plurality of connector mounting portions, wherein when first half and the second half are hingedly attached and the connector organizer is attached to the inner strip, the connectors are arranged on top surfaces of the connector mounting portions and the inner strip,
    wherein the top surfaces are defined as portions of each respective element which is farthest away from the inner surface of one of said first half and second half to which the element is connected.

2. The conductor packaging assembly of claim 1, wherein the inner strip and the connector organizer attach with each other in a hook-n-loop arrangement.

3. The conductor packaging assembly of claim 1, wherein a pull tab is integrally formed with the connector organizer to allow the connector organizer to be detached from the inner strip.

4. The conductor packaging assembly of claim 1, wherein the inner strip is a Velcro strip.

5. The conductor packaging assembly of claim 1, wherein the connector organizer has a Velcro strip on one side thereof which attaches with the inner strip.

6. The conductor packaging assembly of claim 1, wherein the inner strip is attached to the first half and a second inner strip is attached to the second half.

7. The conductor packaging assembly of claim 1, wherein the first half and the second half each have a substantial U-shape in cross section and form a hollow cylindrical shape when attached to one another.

8. The conductor packaging assembly of claim 1, wherein a bottom surface of the connector organizer is connected to the top surface of the inner strip.

9. The conductor packaging assembly of claim 1, wherein a single, flat surface of the inner strip is the only surface of the inner strip in contact with the connector organizer.

10. The conductor packaging assembly of claim 1, wherein the top surfaces of the connector mounting portions are arranged farther away from the inner surface than any other part of the connector organizer.

11. The conductor packaging assembly of claim 1, wherein the connector mounting portions are arranged on top surfaces of the connector organizer,
    the connector organizer is arranged on the top surface of the inner strip,
    the inner strip is arranged on top surfaces of the inner surface of at least one of said first half and second half of the housing.

* * * * *